(12) United States Patent
Scurto et al.

(10) Patent No.: US 7,968,178 B1
(45) Date of Patent: Jun. 28, 2011

(54) INTEGRATED CONCRETE SLAB

(75) Inventors: Gregory M. Scurto, Naples, FL (US); S. Allen Face, Leland, NC (US)

(73) Assignee: Concrete Solutions Consulting, LLC, Naples, FL (US)

( * ) Notice: Subject to any disclaimer, the term of this patent is extended or adjusted under 35 U.S.C. 154(b) by 0 days.

(21) Appl. No.: 12/802,616

(22) Filed: Jun. 10, 2010

(51) Int. Cl.
*B32B 13/02* (2006.01)

(52) U.S. Cl. ................................. 428/294.7

(58) Field of Classification Search .......... 428/294.7
See application file for complete search history.

(56) References Cited

U.S. PATENT DOCUMENTS

| 2006/0201393 | A1* | 9/2006 | Rice et al. ............ 106/644 |
| 2007/0132150 | A1* | 6/2007 | Rice et al. ............ 264/333 |
| 2009/0306249 | A1* | 12/2009 | Lavin et al. ............ 524/4 |

FOREIGN PATENT DOCUMENTS

JP          07119236 A  *  5/1995

* cited by examiner

*Primary Examiner* — N. Edwards
(74) *Attorney, Agent, or Firm* — Peter J. Van Bergen

(57) ABSTRACT

An integrated concrete slab includes concrete with stretchable fibers mixed therein covering and partially integrated with a portion of concrete that contains either no fibers or relatively few fibers mixed therein.

29 Claims, 2 Drawing Sheets

INTEGRATED CONCRETE SLAB

CROSS-REFERENCE TO RELATED PATENT APPLICATIONS

This patent application is co-pending with one related patent application entitled "METHOD OF FABRICATING INTEGRATED CONCRETE SLAB", filed by the same inventors and owned by the same assignee as this patent application.

FIELD OF THE INVENTION

The invention relates generally to concrete slab construction, and more particularly to an integrated concrete slab exhibiting little or no curl.

BACKGROUND OF THE INVENTION

Under normal drying conditions, concrete (e.g., Portland cement concrete with or without pozzolans mixed therein) will shrink from the exposed surfaces inward as it desiccates and hardens. The amount of drying shrinkage typically ranges between approximately 0.0002 to approximately 0.0008 inches per inch with approximately 0.0005 inches per inch being the norm. Significantly, the drying shrinkage does not occur through the full depth of the concrete, but is rather rapidly attenuated to insignificance only a few inches from the exposed surfaces. Since the top is typically the only surface of a concrete slab exposed to drying, it is normal for a downwardly decreasing shrinkage gradient to develop within the uppermost few inches of a slab. As a result of such shrinkage gradient, the top region of a concrete slab tends to "curl" (i.e., develop an upward facing concave curvature) as it dries. This is not a desirable condition, since a measure of quality in a concrete slab is its surface flatness.

SUMMARY OF THE INVENTION

Accordingly, it is an object of the present invention to provide a concrete slab having minimal curl.

Another object of the present invention is to provide a concrete slab that minimizes curl in a cost effective manner.

Other objects and advantages of the present invention will become more obvious hereinafter in the specification and drawings.

In accordance with the present invention, an integrated concrete slab includes concrete that contains approximately 3-9 pounds of stretchable fibers mixed in each cubic yard thereof covering and partially integrated with a portion of concrete that contains either no fibers or relatively few fibers mixed therein.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
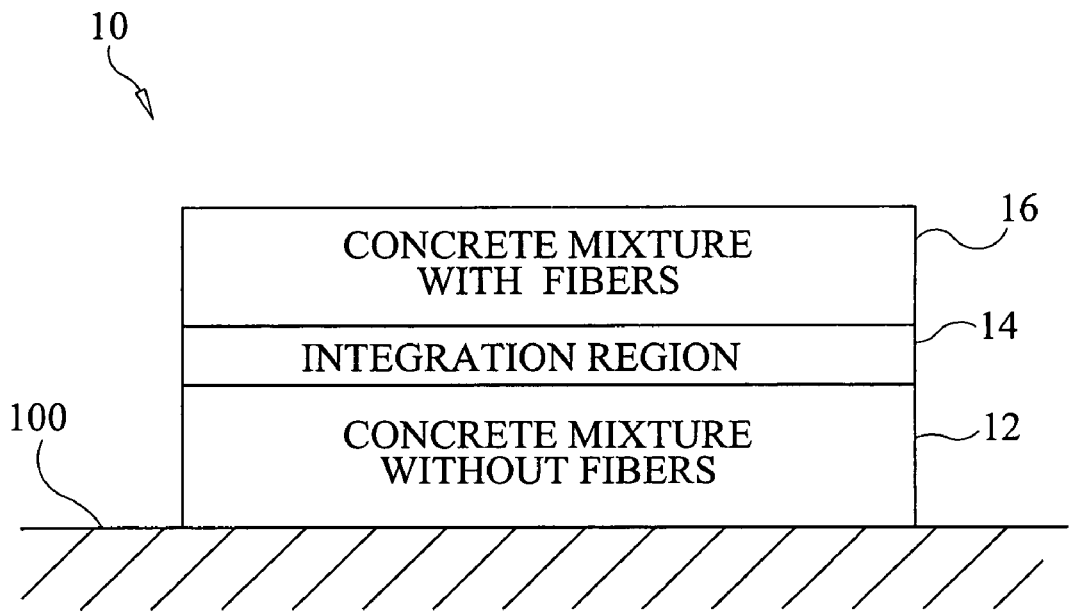
FIG. 1 is a schematic view of a cross-section of an integrated concrete slab in accordance with an embodiment of the present invention.

Referring now to the drawings and more particularly to FIG. 1, an integrated concrete slab in accordance with the present invention is shown and is referenced generally by numeral 10. While the illustration of concrete slab 10 will facilitate an understanding of the novelty of the present invention, it is to be understood that the illustrated dimensions (i.e., both literally and in relative terms) of concrete slab 10 are not meant to represent a scale version of a real concrete slab. Further, the rectangular cross-sectional shape of concrete slab 10 is merely used for illustrative purposes and does not represent a limitation of the present invention.

Concrete slab 10 will typically rest on an earthen, engineered stone, or engineered structural base 100. However, the particular nature of base 100 is not a limitation of the present invention. The only requirement of base 100 is that it provide sufficiently firm support for concrete slab 10 as would be understood in the art.

Moving upward from base 100, concrete slab 10 is generally defined by a concrete mixture 12 containing either no fibers or a relatively small quantity of fibers, an integration region 14, and a concrete mixture 16 containing enough stretchable fibers to decrease the mixture's elastic modulus significantly upon hardening. As will be explained further below, since the inclusion of a low dosage of fibers or other benign fillers in mixture 12 will not improve the performance of the present invention, such fibers/fillers will not typically be included in mixture 12. Accordingly, the illustrated embodiment will refer to mixture 12 as having no fibers mixed therein.

Concrete mixtures 12 and 16 are both typically Portland cement concretes with or without pozzolans (e.g., filler materials having behavioral properties similar to that of cement) mixed therein. As just mentioned, concrete mixture 12 will typically have no fibers mixed therein. However, if fibers are included in concrete mixture 12, they may be of any size and type (e.g., metal, synthetic, or natural). Note that since such fibers will typically increase cost and will provide no appreciable benefit (as they are below the shrinking upper portion of the slab), their inclusion in concrete mixture 12 is generally unnecessary.

Unlike concrete mixture 12, concrete mixture 16 includes a large quantity of stretchable fibers to decrease the elastic modulus of concrete mixture 16 when it hardens. Approximately 3-9 pounds of stretchable fibers should be mixed into each cubic yard of mixture 16 so that it will be flexible enough after setting to eliminate curl of concrete slab 10. For example, the fibers could be polymer macrofibers that range in length from approximately 0.5 inches to approximately 2.5 inches. The fibers could be all the same length or different lengths without departing from the scope of the present invention. The various means for mixing the fibers into concrete mixture 16 are well understood in the art.

Coupling mixtures 12 and 16 is integration region 14 that allows mixtures 12 and 16 to function cooperatively and thereby define integrated concrete slab 10. Integration region 14 is defined when concrete mixture 16 is placed on concrete mixture 12 as will be explained later herein. In terms of the structure of concrete slab 10, integration region 14 is formed by intermixing some of mixture 16 and some of mixture 12. More specifically, with at least the top region of mixture 12 in a plastic state (i.e., also referred to in the art as the state where concrete is said to be "alive"), an integration between this top region of mixture 12 and the bottom region of mixture 16 in its plastic state occurs when the two come into contact with one another. The resulting integration region 14 is thereby defined when the top region of mixture 12 is in its plastic state and when the bottom region of mixture 16 is in its plastic state, i.e, when mixture 16 is placed. Integration region 14 retains its integrating attributes throughout the setting and hardening of concrete slab 10 as well as the entire useful life of concrete slab 10.

The above-recited construction of concrete slab 10 reduces curl that ultimately affects the flatness of the exposed surface of concrete slab 10. That is, upon hardening, concrete slab 10 provides a reduced modulus of elasticity in mixture 16 owing to the stretchable nature of the fibers contained therein. The following three conditions contribute to this result:

shrinkage of concrete slab 10 only occurs within the top several (vertical) inches thereof regardless of its overall (vertical) thickness, mixture 16 occupies this isolated upper shrinking region, and mixture 16 (by virtue of its high stretchable fiber content) exhibits a much lower than normal elastic modulus upon hardening.

As a result, when mixture 16 shrinks, rather than being stiff enough to lift and bend mixture 12 (which is not shrinking) off base 100 (and thus cause concrete slab 10 to curl), it instead stretches sufficiently to allow mixture 12 to remain substantially in contact with base 100. That is, the addition of stretchable fibers in mixture 16 reduces its ability to pull up the non-shrinking portion of concrete slab 10 to reduce curl at the exposed surface of concrete slab 10. Accordingly, curl is minimized when the thickness of mixture 16 is selected such that the shrinkage of integration region 14 is minimized as concrete slab 10 hardens. This result can be achieved for the vast majority of concrete slabs if approximately 2-3 inches of mixture 16 is placed during fabrication. Since the inclusion of stretchable fibers is only required in a portion of concrete slab 10, the present invention provides a cost-effective approach for producing concrete slabs having little or no curl.

Figure 2:
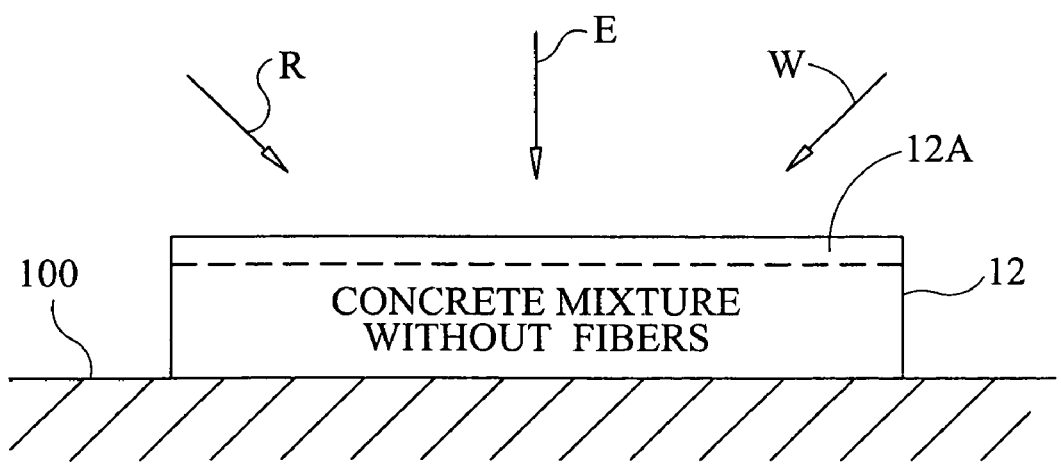
FIG. 2 is a schematic view of a non-fiber concrete mixture after placement on a base in accordance with a method of fabricating the integrated concrete slab.
Figure 3:
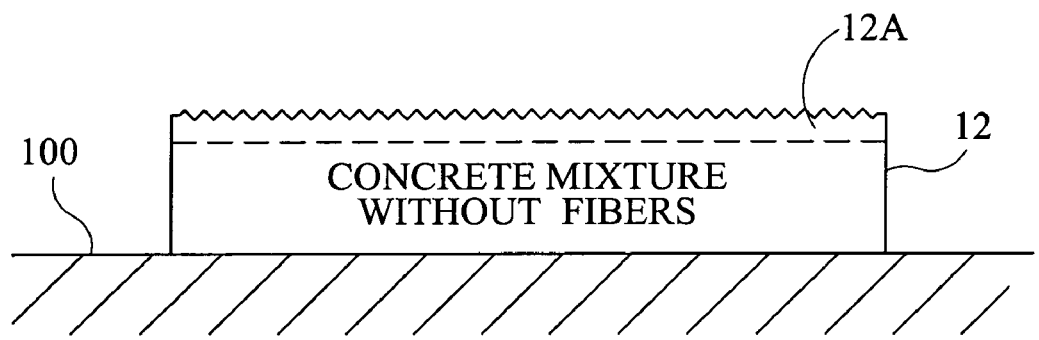
FIG. 3 is a schematic view of the non-fiber concrete mixture with its top region in a plastic state and roughened in accordance with an embodiment of the present invention.

The method of fabricating integrated concrete slab 10 will now be explained using the sequence of schematic illustrations in FIGS. 2-4 that depict a typical fabrication sequence. In FIG. 2, concrete mixture 12 is placed on base 100 in accordance with methodologies well understood in the art. Mixture 12 is configured as described earlier herein, i.e., either no fibers or relatively few fibers are mixed therein. While the particular vertical thickness of mixture 12 on base 100 is not a limitation of the present invention, it will typically be more than two inches thick.

Using procedures well-known in the art, mixture 12 can be the recipient of activities designed to make mixture 12 set from its bottom. That is, the various activities are designed such that the last portion of mixture 12 that is allowed to set is its top region 12A. Until it is set, mixture 12 is said to be "alive" or in its plastic state, i.e., deformable but not capable of rebounding to a pre-deformed state. In accordance with the present invention, it is critical that, at a minimum, top region 12A of mixture 12 remain in its plastic state during fabrication of the present invention's integrated concrete slab. This can be achieved passively by monitoring the state of top region 12A, or actively by (i) applying a retardant (e.g., a solution of sugar and water) to top region 12A as indicated by the arrow referenced by the letter "R", (ii) wetting top region 12A with water as indicated by the arrow referenced by the letter "W", or (iii) applying an evaporation inhibitor (e.g., cetyl alcohol) to top region 12A as indicated by the arrow referenced by the letter "E".

While top region 12A is plastic, it may also be desirable to roughen (e.g., via raking, rough troweling, etc.) top region 12A to prepare it for receipt of mixture 16. Accordingly, FIG. 3 illustrates the exposed surface of top region 12A as being irregular after the roughening thereof. Since such roughening will typically require workers (not shown) to stand/walk on mixture 12, the roughening process will typically not occur until the portion of mixture 12 beneath top region 12A has set such that workers will not sink into mixture 12 beyond top region 12A.

Figure 4:
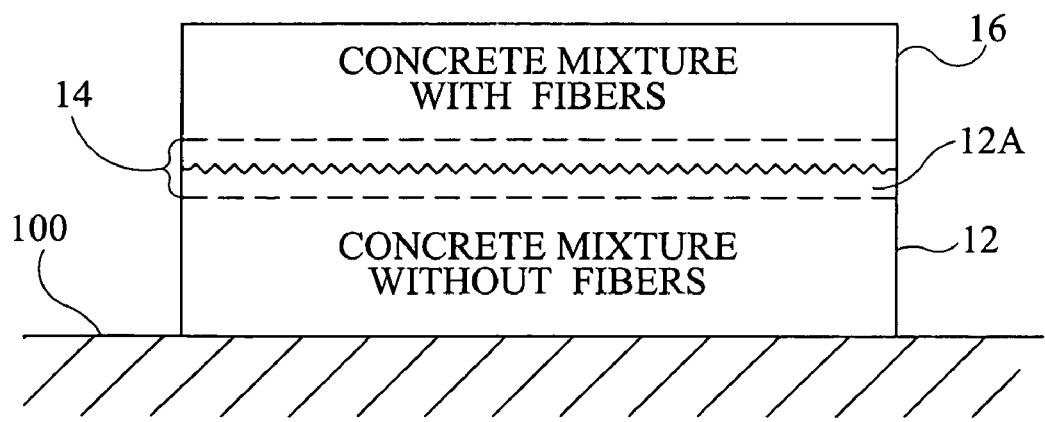
FIG. 4 is a schematic view of the non-fiber concrete mixture with its top region in a plastic state and roughened, and further having a plastic stretchable-fiber-inclusive concrete mixture placed thereon in accordance with the present invention.

Following placement of mixture 12 and while top region 12A is in its plastic state and has optionally been roughened as just described, mixture 16 is placed on mixture 12 as shown in FIG. 4. Mixture 16 is configured as described earlier herein, i.e., stretchable fibers are mixed therein. Since mixture 16 is in its plastic state when it is placed and top region 12A is in its plastic state as described above, integration between the lower portion of mixture 16 and top region 12A begins upon contact therebetween, and can be further enhanced by the typical succession of routine mechanical concrete finishing processes (e.g., screeding, vibrating, troweling, etc.) as these tend to further compress mixture 16 while it is plastic. As a result, integration region 14 is defined as indicated in FIG. 4 by the region between the two horizontally-oriented dashed lines. After mixture 16 has been placed, finishing of the top surface thereof can proceed with a variety of processing steps well known in the art of concrete construction.

The advantages of the present invention are numerous. The integrated concrete slab resists curling during the hardening thereof as the stretchable fibers reduce the modulus of elasticity of the shrinking portion of the slab while the shrinking portion is integrated with the non-shrinking portion of the slab. Since the inclusion of the stretchable fibers is only required in that fraction of the overall slab where they will provide benefit, the cost associated with the use of such fibers is minimized.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An integrated concrete slab, comprising:
   a first region including concrete in its plastic state with approximately 3-9 pounds of stretchable fibers mixed in each cubic yard thereof;
   a second region disposed below said first region, said second region including concrete that is at least partially in its plastic state; and
   a third region defined by a mixture of a portion of said first region with a portion of said concrete that is at least partially in its plastic state from said second region.

2. An integrated concrete slab as in claim 1, wherein said concrete in said first region comprises Portland cement concrete.

3. An integrated concrete slab as in claim 1, wherein said concrete in said first region comprises Portland cement concrete with pozzolans mixed therein.

4. An integrated concrete slab as in claim 1, wherein said second region comprises Portland cement concrete.

5. An integrated concrete slab as in claim 1, wherein said second region comprises Portland cement concrete with at least pozzolans mixed therein.

6. An integrated concrete slab as in claim 1, wherein said stretchable fibers comprise polymer-based macrofibers.

7. An integrated concrete slab as in claim 1, wherein said stretchable fibers are approximately 0.5 to approximately 2.5 inches in length.

8. An integrated concrete slab as in claim 1, wherein thickness of said first region is selected to minimize shrinkage of said third region during hardening of said third region.

9. An integrated concrete slab as in claim 1, wherein said second region is completely in its plastic state.

10. An integrated concrete slab, comprising:
   a first region including concrete in its plastic state with approximately 3-9 pounds of polymer-based macrofibers mixed in each cubic yard thereof;
   a second region disposed below said first region, said second region including concrete that is at least partially in its plastic state;
   a third region defined by a mixture of a portion of said first region with a portion of said concrete that is at least partially in its plastic state from said second region; and
   a thickness of said first region being selected to minimize shrinkage of said third region during hardening of said third region.

11. An integrated concrete slab as in claim 10, wherein said concrete in said first region comprises Portland cement concrete.

12. An integrated concrete slab as in claim 10, wherein said concrete in said first region comprises Portland cement concrete with pozzolans mixed therein.

13. An integrated concrete slab as in claim 10, wherein said second region comprises Portland cement concrete.

14. An integrated concrete slab as in claim 10, wherein said second region comprises Portland cement concrete with at least pozzolans mixed therein.

15. An integrated concrete slab as in claim 10, wherein said macrofibers are approximately 0.5 to approximately 2.5 inches in length.

16. An integrated concrete slab, comprising concrete in its plastic state with approximately 3-9 pounds of stretchable fibers mixed in each cubic yard thereof, said concrete in its plastic state covering and partially blended into a portion of concrete that is at least partially in its plastic state and does not have said fibers mixed therein.

17. An integrated concrete slab as in claim 16, wherein said concrete in its plastic state comprises Portland cement concrete.

18. An integrated concrete slab as in claim 16, wherein said concrete in its plastic state comprises Portland cement concrete with pozzolans mixed therein.

19. An integrated concrete slab as in claim 16, wherein said concrete that is at least partially in its plastic state and does not have said fibers mixed therein comprises Portland cement concrete.

20. An integrated concrete slab as in claim 16, wherein said concrete that is at least partially in its plastic state and does not have said fibers mixed therein comprises Portland cement concrete with pozzolans mixed therein.

21. An integrated concrete slab as in claim 16, wherein said stretchable fibers comprise polymer-based macrofibers.

22. An integrated concrete slab as in claim 16, wherein said stretchable fibers are approximately 0.5 to approximately 2.5 inches in length.

23. An integrated concrete slab, comprising concrete with approximately 3-9 pounds of stretchable fibers mixed in each cubic yard thereof covering and partially integrated with a portion of concrete that does not have said fibers mixed therein.

24. An integrated concrete slab as in claim 23, wherein said concrete with said fibers mixed therein comprises Portland cement concrete.

25. An integrated concrete slab as in claim 23, wherein said concrete with said fibers mixed therein comprises Portland cement concrete with pozzolans mixed therein.

26. An integrated concrete slab as in claim 23, wherein said concrete that does not have said fibers mixed therein comprises Portland cement concrete.

27. An integrated concrete slab as in claim 23, wherein said concrete that does not have said fibers mixed therein comprises Portland cement concrete with pozzolans mixed therein.

28. An integrated concrete slab as in claim 23, wherein said stretchable fibers comprise polymer-based macrofibers.

29. An integrated concrete slab as in claim 23, wherein said stretchable fibers are approximately 0.5 to approximately 2.5 inches in length.

* * * * *